US012131508B2

(12) United States Patent
Huang et al.

(10) Patent No.: US 12,131,508 B2
(45) Date of Patent: Oct. 29, 2024

(54) DYNAMIC MESH COMPRESSION BASED ON POINT CLOUD COMPRESSION

(71) Applicant: Tencent America LLC, Palo Alto, CA (US)

(72) Inventors: Chao Huang, Palo Alto, CA (US); Xiang Zhang, Sunnyvale, CA (US); Jun Tian, Belle Mead, NJ (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 105 days.

(21) Appl. No.: 17/962,201

(22) Filed: Oct. 7, 2022

(65) Prior Publication Data

US 2023/0177738 A1 Jun. 8, 2023

Related U.S. Application Data

(60) Provisional application No. 63/285,967, filed on Dec. 3, 2021.

(51) Int. Cl.
*G06T 9/20* (2006.01)
*G06T 9/00* (2006.01)

(52) U.S. Cl.
CPC ..................... *G06T 9/20* (2013.01)

(58) Field of Classification Search
None
See application file for complete search history.

(56) References Cited

U.S. PATENT DOCUMENTS

2017/0347122 A1 11/2017 Chou et al.
2018/0024532 A1* 1/2018 Burton ............... G01M 17/007
700/114

(Continued)

FOREIGN PATENT DOCUMENTS

JP    2001-506828 A    5/2001
WO    2021/136878 A1   7/2021

OTHER PUBLICATIONS

Kazhdan, Michael, Matthew Bolitho, and Hugues Hoppe. "Poisson surface reconstruction." In Proceedings of the fourth Eurographics symposium on Geometry processing, vol. 7. 2006.

(Continued)

*Primary Examiner* — Edemio Navas, Jr.
(74) *Attorney, Agent, or Firm* — ArentFox Schiff LLP

(57) ABSTRACT

Aspects of the disclosure provide methods and apparatuses for mesh coding (encoding and/or decoding). In some examples, an apparatus for coding mesh includes processing circuitry. The processing circuitry decodes, using a point cloud compression (PCC) decoder and from a bitstream, a point cloud that includes first points corresponding to vertices in a three dimensional (3D) mesh frame. The 3D mesh frame represents a surface of an object with polygons. The processing circuitry decodes, from the bitstream, first connectivity information of the 3D mesh frame. The first connectivity information has been signaled in the bitstream. The processing circuitry infers, second connectivity information of the 3D mesh frame, from the first points of the point cloud. The second connectivity information is not signaled in the bitstream. The processing circuitry reconstructs the 3D mesh frame based on the point cloud, the first connectivity information and the second connectivity information.

20 Claims, 15 Drawing Sheets

(56) References Cited

U.S. PATENT DOCUMENTS

| | | | |
|---|---|---|---|
| 2018/0276884 A1* | 9/2018 | Feng | G06T 17/30 |
| 2020/0250540 A1* | 8/2020 | Mehr | G06T 17/20 |
| 2020/0286261 A1 | 9/2020 | Faramarzi et al. | |
| 2021/0005016 A1 | 1/2021 | Oh | |
| 2021/0090301 A1 | 3/2021 | Mammou et al. | |
| 2021/0279957 A1* | 9/2021 | Eder | G06T 7/80 |
| 2021/0295566 A1 | 9/2021 | Graziosi et al. | |
| 2022/0028119 A1* | 1/2022 | Rhyu | G06T 9/001 |
| 2022/0164994 A1 | 5/2022 | Joshi et al. | |
| 2023/0051312 A1* | 2/2023 | Catana Salazar | B33Y 50/00 |

OTHER PUBLICATIONS

Cao et al., "3D Point Cloud Compression: A Survey"; Web3D '19: The 24th International Conference on 3D Web Technology; Jul. 2019, pp. 1-9; Published:Jul. 26, 2019.

Pavez et al., "Dynamic Polygon Cloud Compression"; Published in: 2017 IEEE International Conference on Acoustics, Speech and Signal Processing (ICASSP); Date of Conference: Mar. 5-9, 2017.

International Search Report and Written Opinion issued Jan. 6, 2023 in Application No. PCT/US2022/077890, 16 pages.

Office Action received for Japanese Patent Application No. 2023-555698, mailed on Jul. 2, 2024, 16 pages (9 pages of English Translation and 7 pages of Original Document).

* cited by examiner

DYNAMIC MESH COMPRESSION BASED ON POINT CLOUD COMPRESSION

INCORPORATION BY REFERENCE

This present application claims the benefit of priority to U.S. Provisional Application No. 63/285,967, "Dynamic Mesh Compression based on Point Cloud Compression" filed on Dec. 3, 2021. The entire disclosure of the prior application is hereby incorporated by reference in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (encoding and/or decoding). In some examples, an apparatus for coding mesh includes processing circuitry. The processing circuitry decodes, using a point cloud compression (PCC) decoder and from a bitstream, a point cloud that includes first points corresponding to vertices in a three dimensional (3D) mesh frame. The 3D mesh frame represents a surface of an object with polygons. The processing circuitry decodes, from the bitstream, first connectivity information of the 3D mesh frame. The first connectivity information has been signaled in the bitstream. The processing circuitry infers, second connectivity information of the 3D mesh frame, from the first points of the point cloud. The second connectivity information is not signaled in the bitstream. The processing circuitry reconstructs, the 3D mesh frame based on the point cloud, the first connectivity information and the second connectivity information.

In some examples, the first connectivity information includes first connectivity of a first plurality of vertices in a first region of the 3D mesh frame, the second connectivity information includes second connectivity of a second plurality of vertices in a second region of the 3D mesh frame, the first region has a higher vertex density than the second region.

In some examples, the first connectivity information includes connectivity of a first plurality of vertices in a first region, a curvature parameter of the first region is larger than a threshold.

In some examples, the first connectivity information includes connectivity of a first plurality of vertices in a first region, and normal values in the first region satisfy a requirement.

In some examples, the first connectivity information includes first connectivity of first polygons of the 3D mesh frame. The processing circuitry determines one or more additional sample points inside the first polygons by interpolation, and infers the second connectivity information of all of the first points and the one or more additional sample points.

In some examples, the second connectivity information includes a polygon with a first edge that connects a first vertex in a first chart and a second vertex in a second chart. The processing circuitry determines a color of a point inside the polygon by an interpolation based on at least a first color of the first vertex and a second color of the second vertex.

In some examples, the first connectivity information includes a connectivity difference between original connectivity of the 3D mesh frame and inferred connectivity of the 3D mesh frame, the processing circuitry combines the first connectivity information with the second connectivity information to generate recovered connectivity information of the 3D mesh frame, and reconstructs the 3D mesh frame based on the point cloud and the recovered connectivity information of the 3D mesh frame.

In some examples, the first connectivity information includes a first edge connecting a first vertex and a second vertex to indicate that the first edge is a false edge connecting two different charts. The processing circuitry determines a chart boundary edge that crosses the first edge, and replaces the first edge with the chart boundary edge in the second connectivity information.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
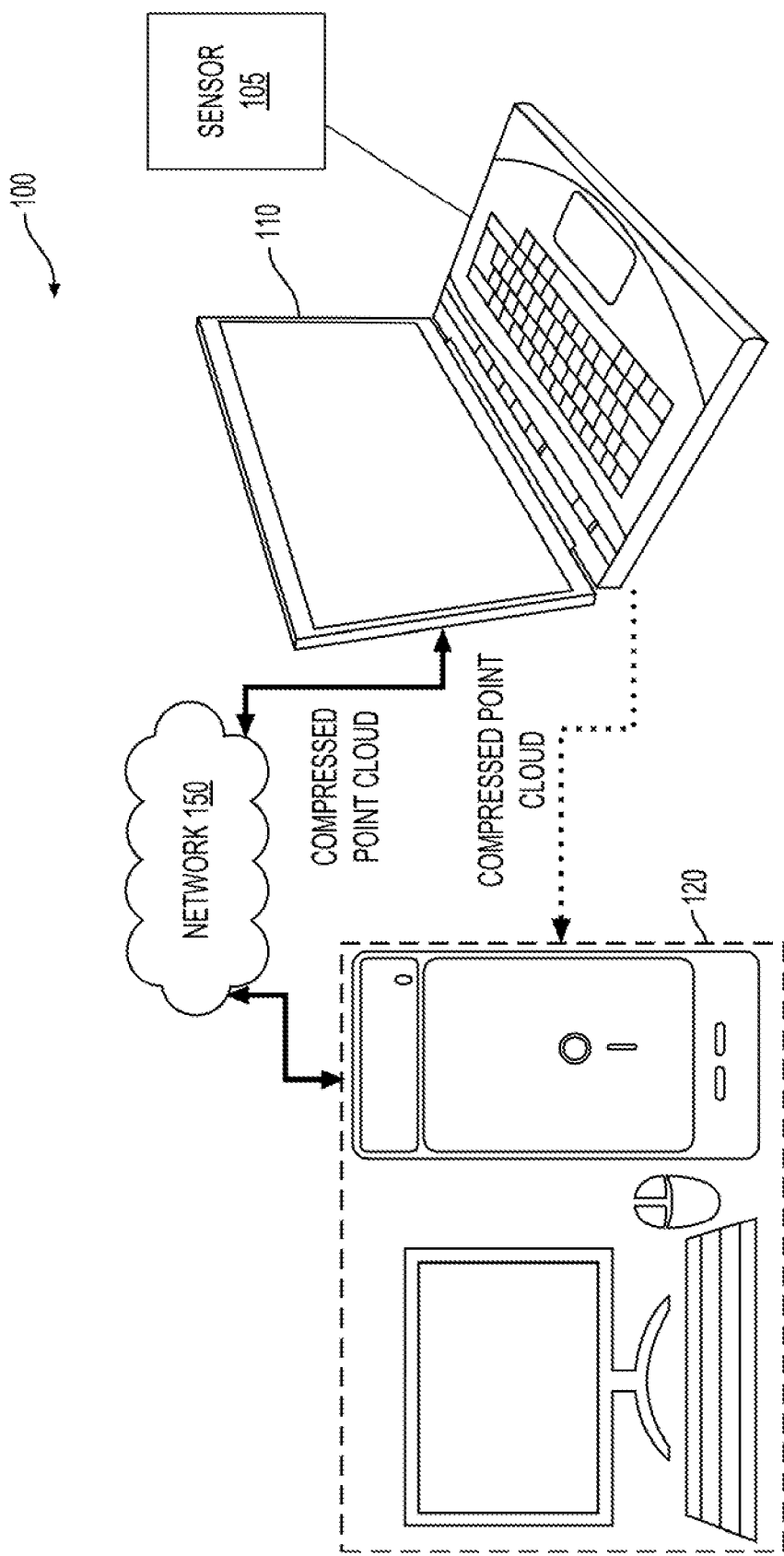
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
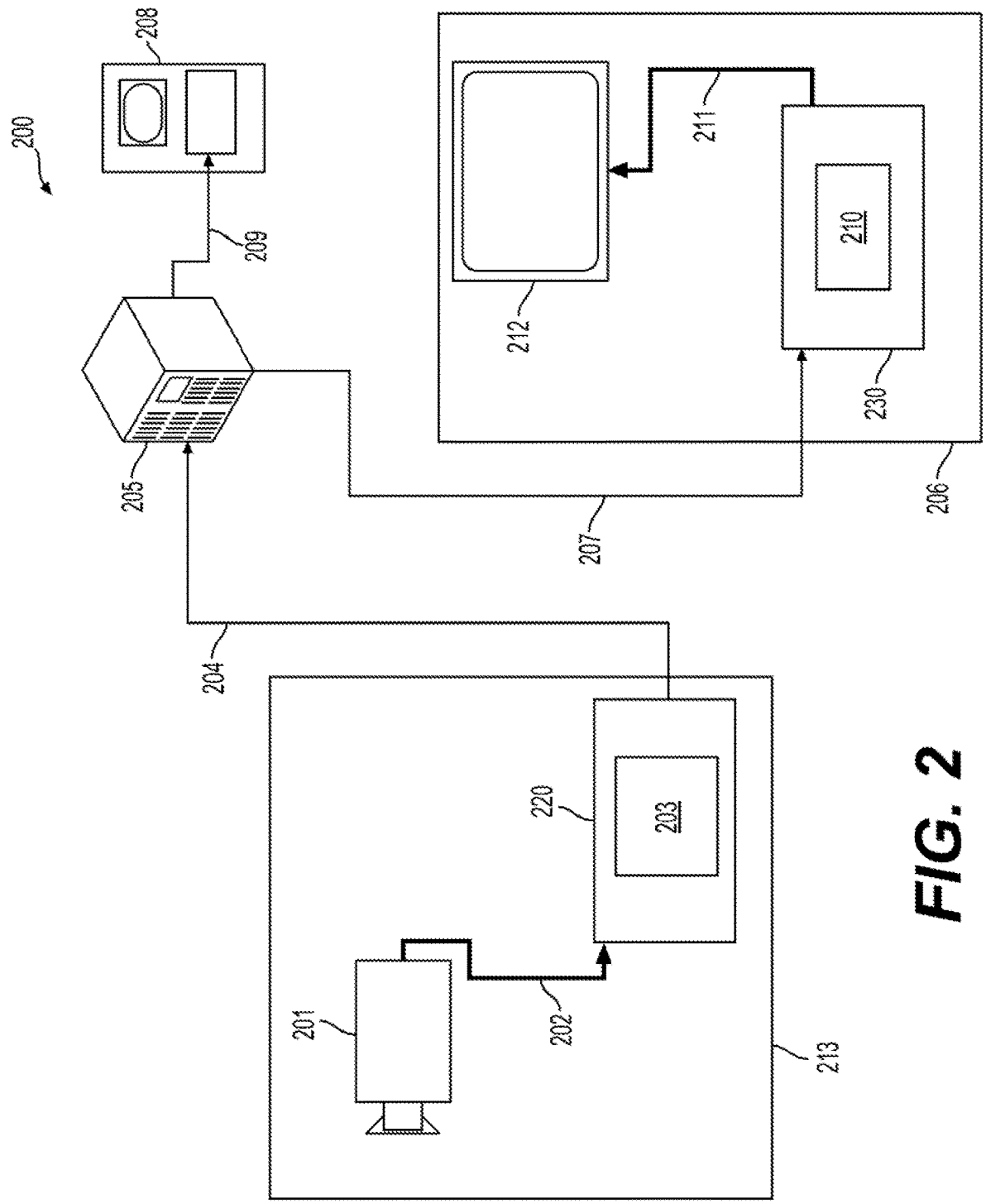
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
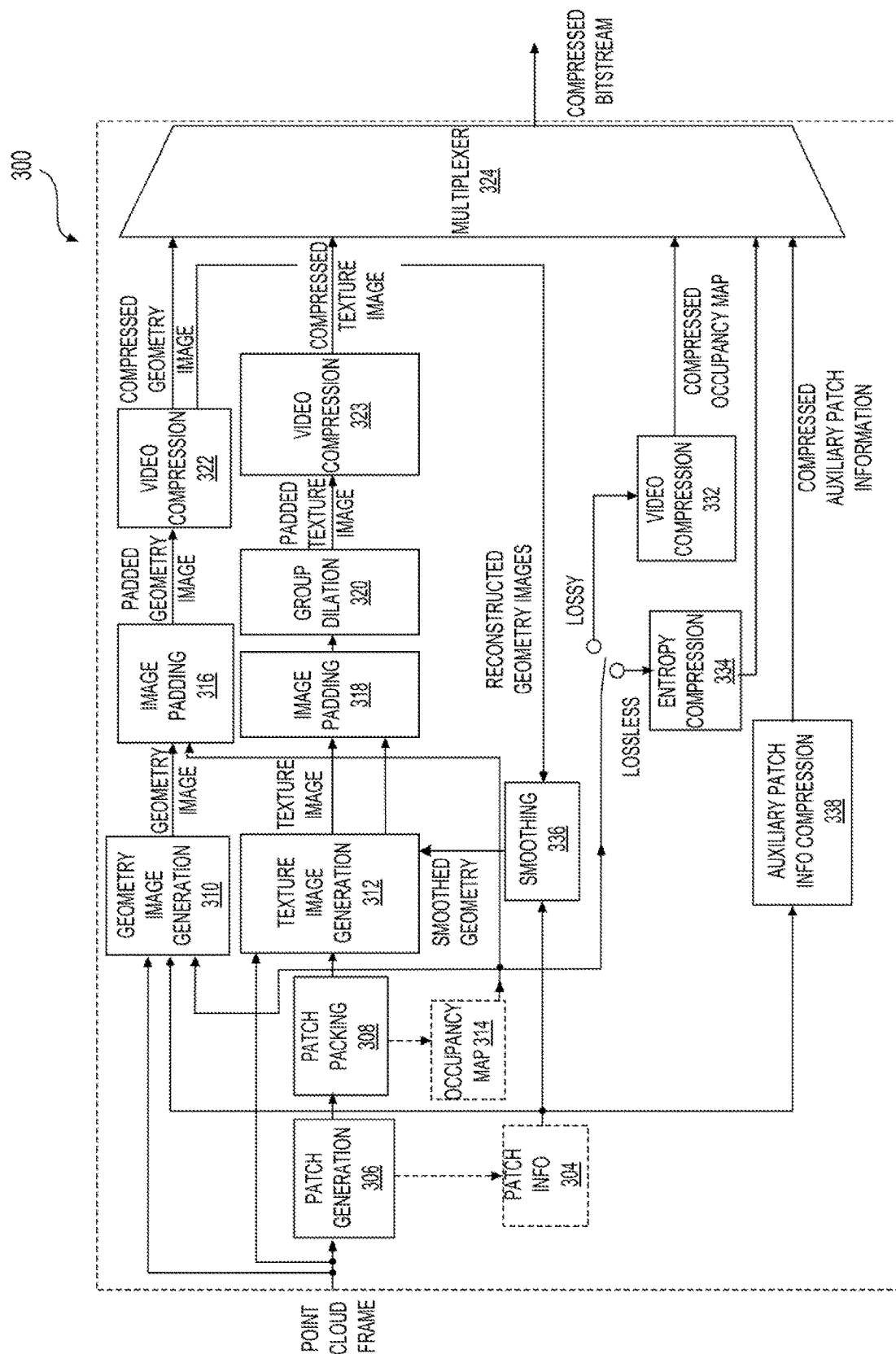
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
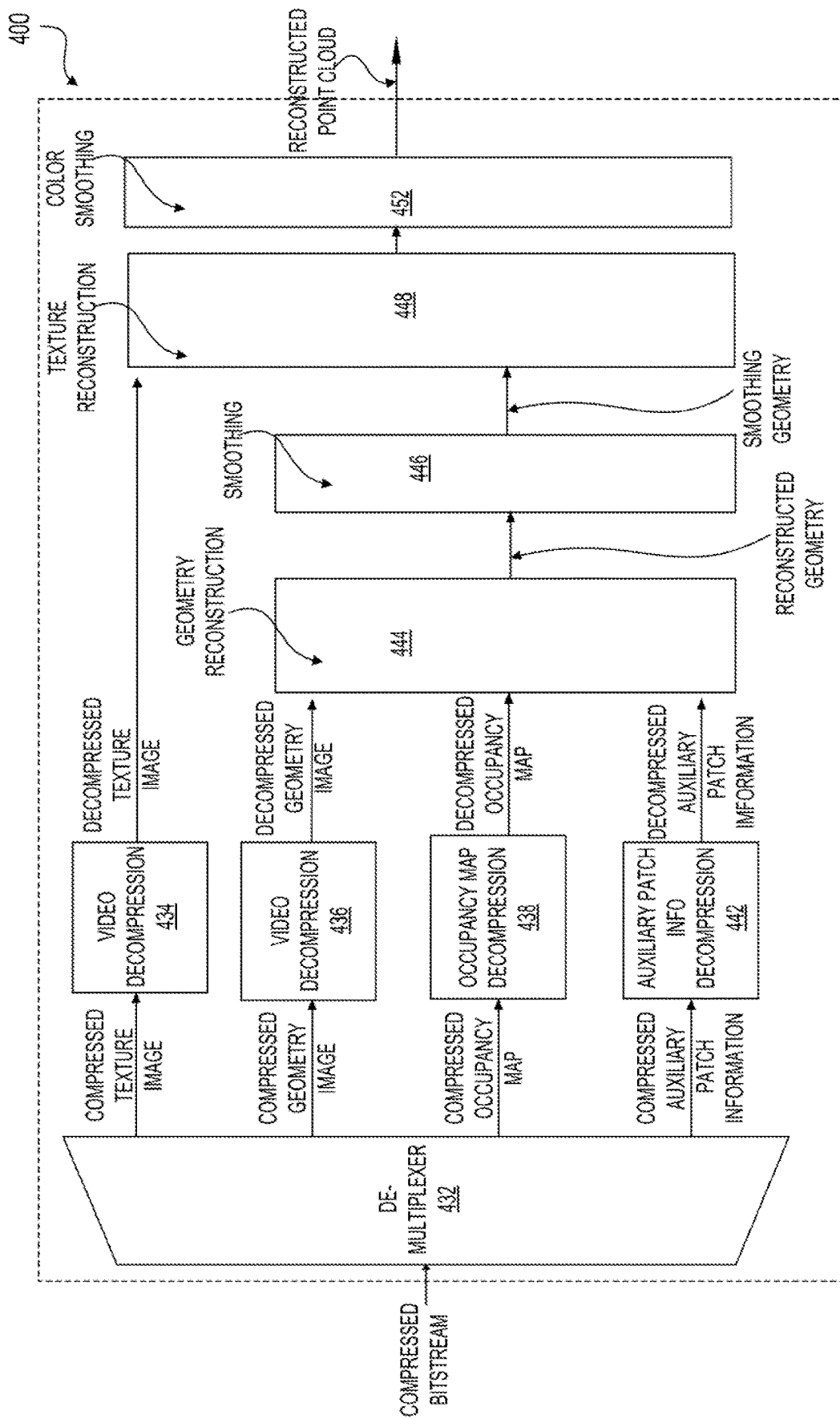
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
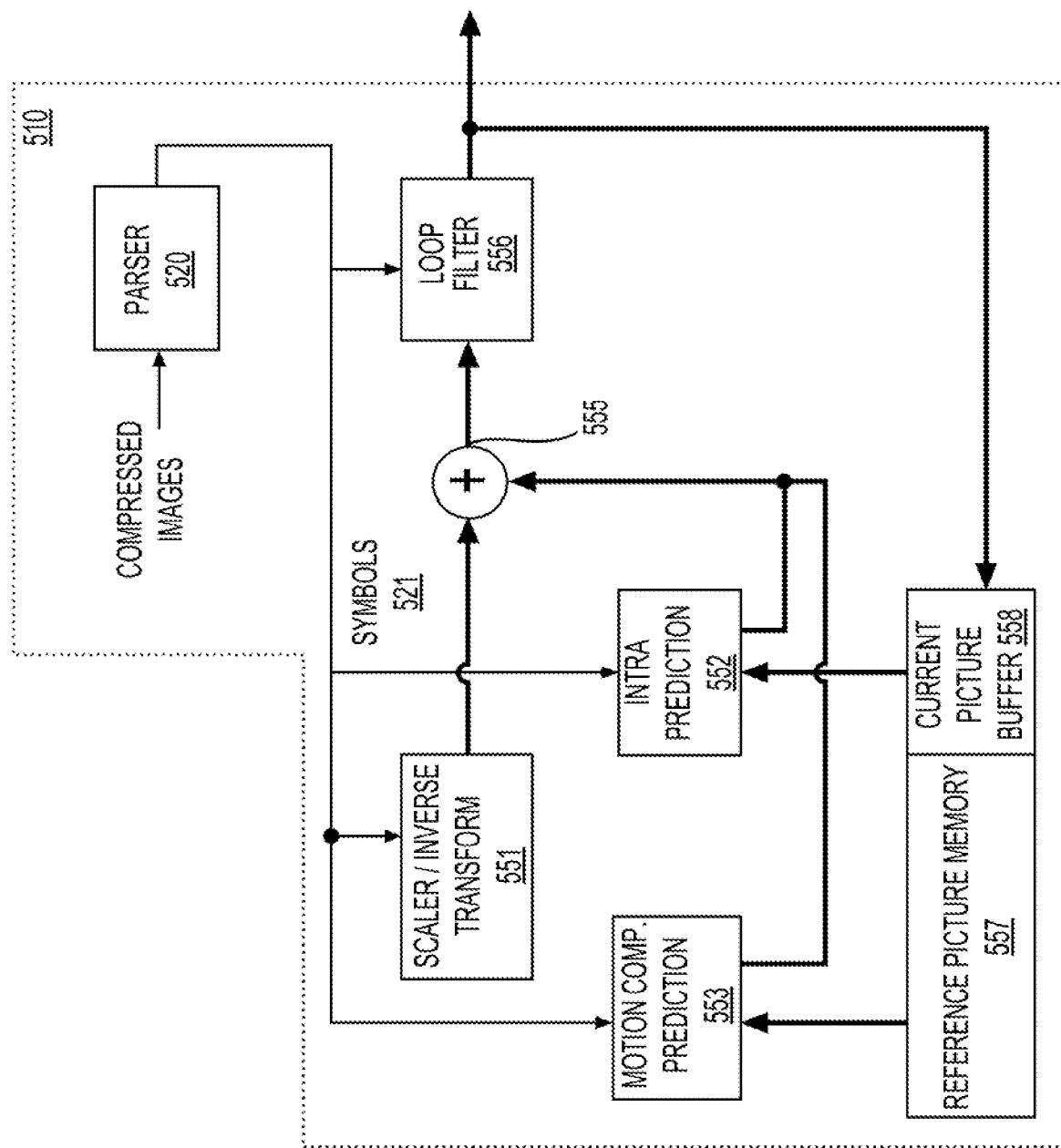
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
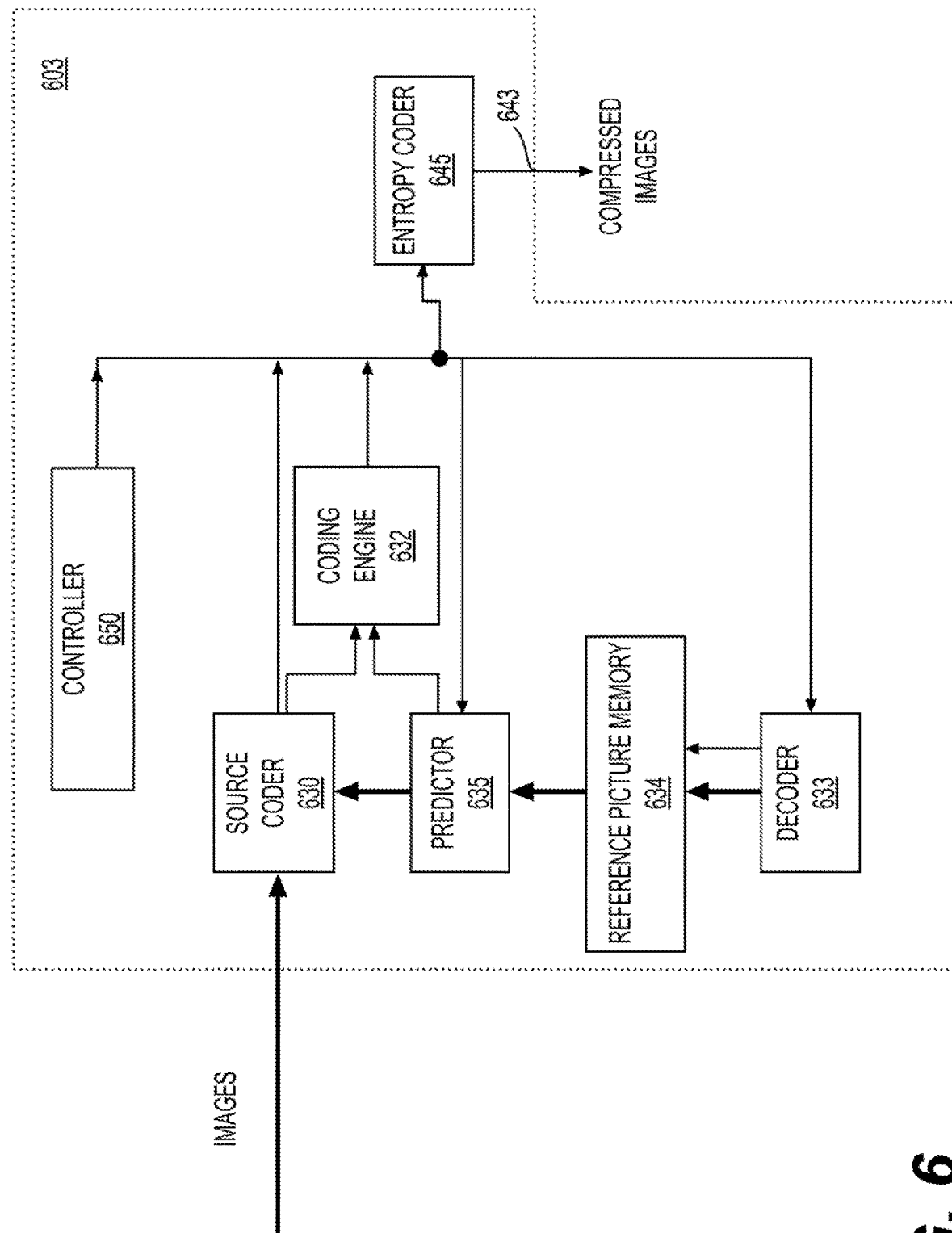
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
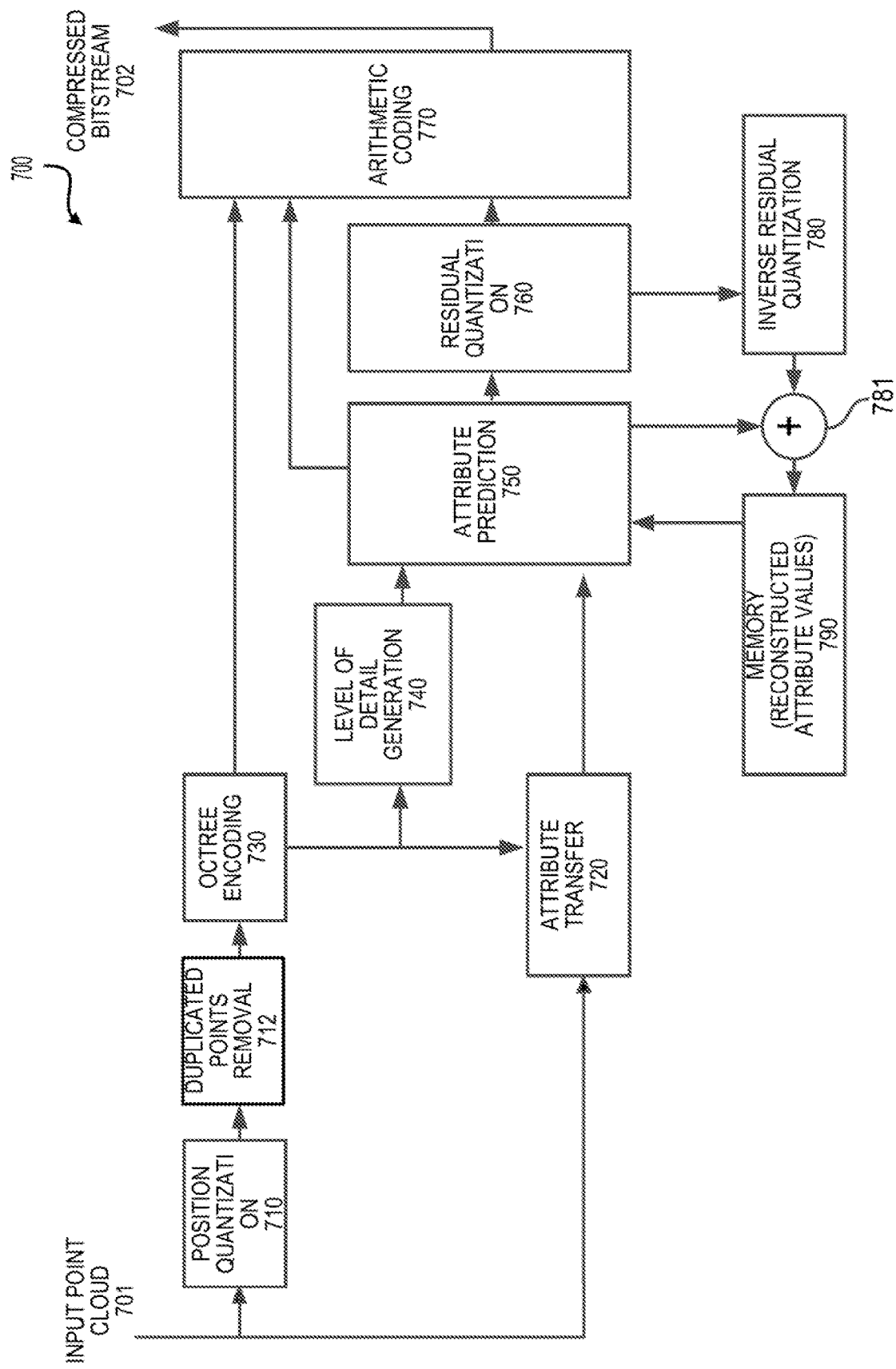
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions.

The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
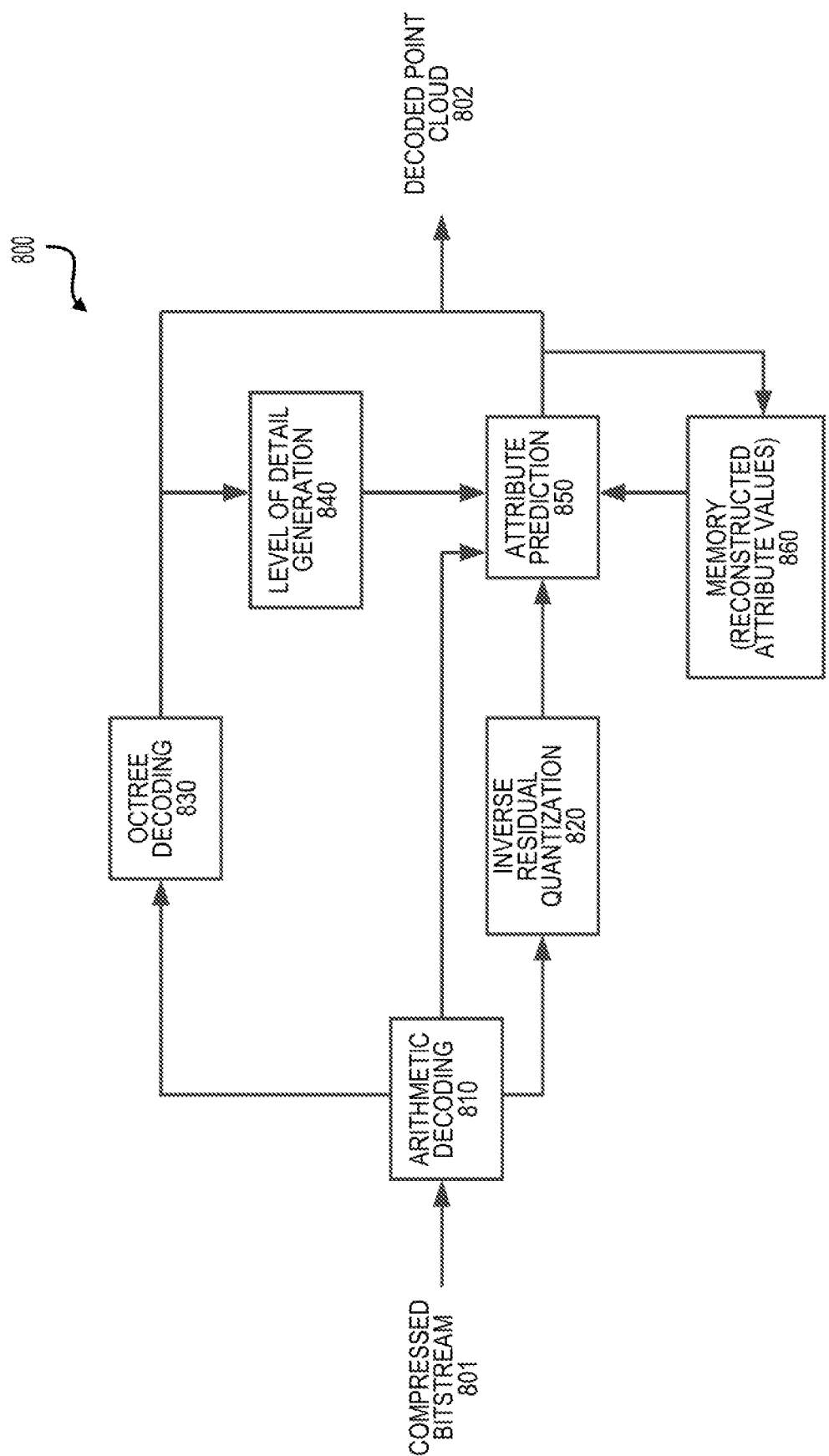
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples. A boundary loop includes a sequence of boundary vertices, boundary edges formed by the sequence of boundary vertices can form a loop that is referred to as a boundary loop.

According to an aspect of the disclosure, the patches are parameterized respectively into 2D shapes (also referred to as UV patches) in some examples. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed by representing a mesh using one or more 2D maps (also referred to as 2D atlas in some examples), and then encoding the 2D maps using image or video codecs. Different techniques can be used to generate the 2D maps.

Figure 9:
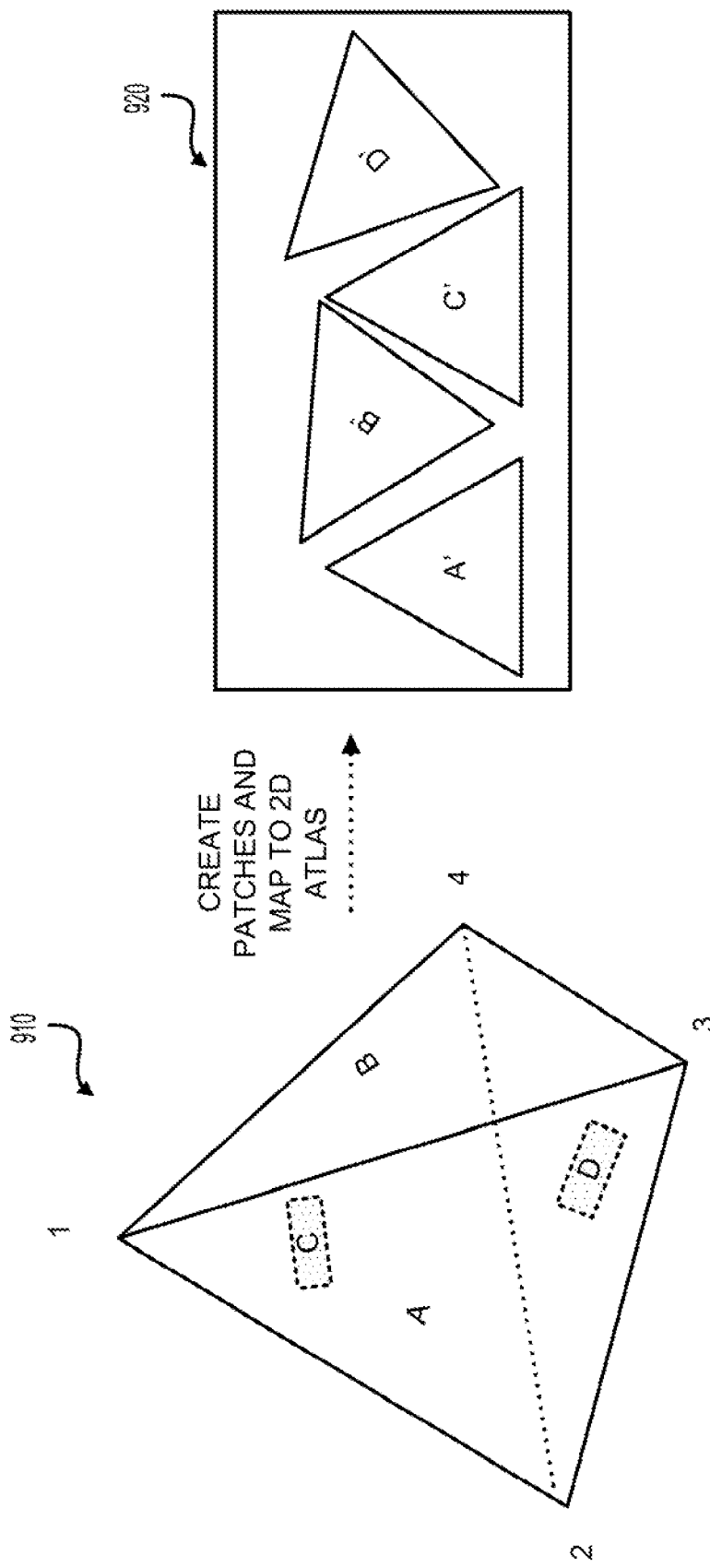
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as UV atlas (920) or map (920). For example, the patch A is mapped to a 2D shape (also referred to as UV patch) A' in the map (920), the patch B is mapped to a 2D shape (also referred to as UV patch) B' in the map (920), the patch C is mapped to a 2D shape (also referred to as UV patch) C' in the map (920), and the patch D is mapped to a 2D shape (also referred to as UV patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinates in the map (920).

The map (920) can be geometry map with geometry information, or can be texture map with color, normal, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). In some examples, mesh frames in a dynamic mesh can be representations of a surface of an object at different time, and each mesh frame is a representation of the surface of the object at a specific time (also referred to as a time instance). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

According to some aspects of the disclosure, the above PCC (e.g., G-PCC, V-PCC) encoders and decoders can be used in frameworks for mesh compression, such as static mesh compression, dynamic mesh compression, compression of a dynamic mesh with constant connectivity information, compression of a dynamic mesh with time varying connectivity information, compression of a dynamic mesh with time varying attribute maps, and the like.

Figure 10:
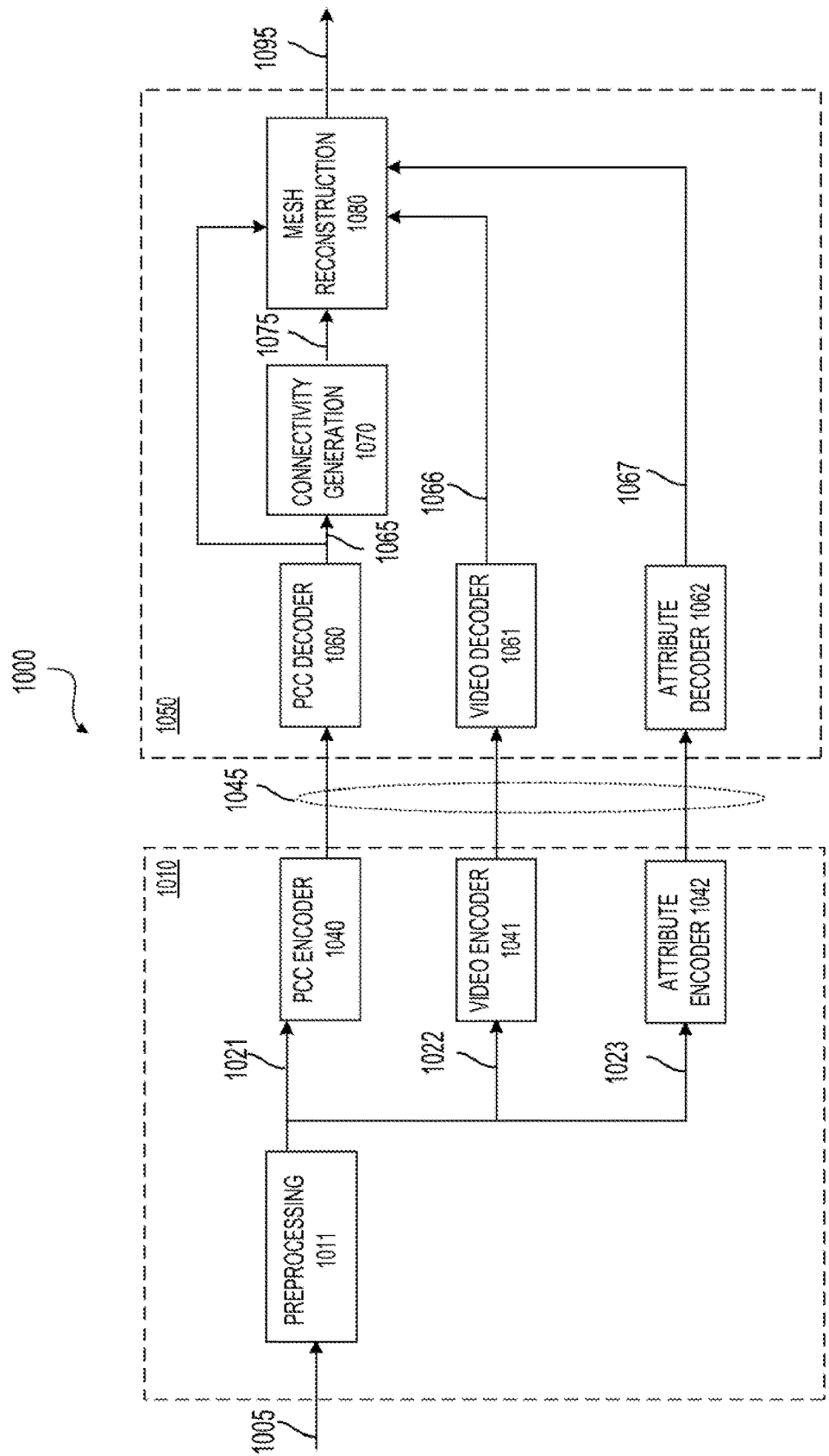
FIG. 10 shows a diagram of a framework for mesh compression according to some embodiments of the disclosure.

FIG. 10 shows a diagram of a framework (1000) for mesh compression according to some embodiments of the disclosure. The framework (1000) includes a mesh encoder (1010) and a mesh decoder (1050). The mesh encoder (1010) encodes an input mesh (1005) (a mesh frame in case of a dynamic mesh) into a bitstream (1045), and the mesh decoder (1050) decodes the bitstream (1045) to generate a reconstructed mesh (1095) (a mesh frame in case of a dynamic mesh).

The mesh encoder (1010) can be any suitable device, such as a computer, a server computer, a desktop computer, a laptop computer, a tablet computer, a smart phone, a gaming device, an AR device, a VR device, and the like. The mesh decoder (1050) can be any suitable device, such as a computer, a client computer, a desktop computer, a laptop computer, a tablet computer, a smart phone, a gaming device, an AR device, a VR device, and the like. The bitstream (1045) can be transmitted from the mesh encoder (1010) to the mesh decoder (1050) via a network (not shown).

In the FIG. 10 example, the mesh encoder (1010) includes a preprocessing module (1011), and a plurality of encoders, such as a PCC encoder (1040), a video encoder (1041), an attribute encoder (1042) and the like.

The preprocessing module (1011) is configured to convert the input mesh (1005) to suitable *intermedia* data having multiple sections for encoding by the plurality of encoders. In an example, the preprocessing module (1011) can convert the input mesh (1005) to a voxelized mesh that includes a collection of equally-sized blocks on a 3D grid. The voxelized mesh can hold information about volume and connectivity.

In an example, information of the input mesh (1005) can be converted into vertices (1021), texture maps (1022) and other attributes (1023). The vertices (1021) can include geometry information of the vertices, such as (x,y,z) coordinates that describe the positions of the vertices. The vertices (1021) can also include the vertex attributes, such as normal, color reflectance, and the like. The texture maps (1022) (also referred to as attribute maps in some examples) are attributes associated with mesh surface. In some examples, the texture maps (1022) for a sequence of mesh frames can form a video sequence. The other attributes (1023) can include attributes that may not be able to be coded by PCC encoders. In some examples, the other attributes (1023) includes mapping information, such as mapping of 3D coordinates (e.g., (x, y, z)) with 2D coordinates (e.g., UV coordinates (u,v)).

According to an aspect of the disclosure, the vertices (1021) can be viewed as a point cloud and can be coded by the PCC encoder (1040). The PCC encoder (1040) can be any suitable PCC encoder, such as V-PCC encoder, G-PCC, and the like. It is noted that the vertex attributes (attributes associated with vertices), such as normal, color, reflectance, and the like, can be encoded by PCC encoder (1040).

The texture maps (1022) can be viewed as a video sequence and can be encoded by the video encoder (1041). In some examples, the texture maps (1022) can be different from the original texture maps in the input mesh (1005). The texture maps (1022) can be generated by any suitable algorithms.

The other attributes (1023) that may not be able to be coded by the PCC encoder (1040) and the video encoder (1041), can be encoded by the attribute encoder (1042). The attribute encoder (1042) can be implemented with any other attribute encoding techniques that are suitable for encoding the other attributes (1023). For example, the other attributes (1023) includes the UV coordinates (u,v), and the attribute encoder (1042) is configured to encode the UV coordinates (u,v).

In the FIG. 10 example, the encoded outputs from the PCC encoder 1040, the video encoder (1041) and the attribute encoder (1042) are mixed (e.g., multiplexed) into the bitstream (1045) that carries the encoded mesh for the input mesh (1005).

In the FIG. 10 example, the mesh decoder (1050) can demultiplex the bitstream (1045) into sections to be decoded respectively by a plurality of decoders, such as a PCC decoder (1060), a video decoder (1061) and an attribute decoder (1062).

In an example, the PCC decoder (1060) corresponds the PCC encoder (1040), and can decode a section of the bitstream (1045) that is encoded by the PCC encoder (1040). The PCC decoder (1060) can generate a point cloud (1065) with points that are vertices for a mesh.

The connectivity generation module (1070) can estimate the connectivity information (1075) (also referred to as topology) from the decoded points (vertices in the context of a mesh) in the point cloud (1065). It is noted that any suitable algorithm can be used by the connectivity generation module (1070) to estimate the connectivity information of the vertices.

In the FIG. 10 example, the point cloud (1065) and the connectivity information (1075) are provided to the mesh reconstruction module (1080).

In an example, the video decoder (1061) corresponds the video encoder (1041), and can decode a section of the bitstream (1045) that is encoded by the video encoder (1041). The video decoder (1061) can generate decoded texture maps (1066). The decoded texture maps (1066) are provided to the mesh reconstruction module (1080).

In an example, the attribute decoder (1062) corresponds the attribute encoder (1042), and can decode a section of the bitstream (1045) that is encoded by the attribute encoder (1042). The attribute decoder (1062) can generate decoded attributes (1067). The decoded attributes (1067) are provided to the mesh reconstruction module (1080).

The mesh reconstruction module (1080) receives the point cloud (1065), the connectivity information (1075), the decoded texture maps (1066) and the decoded attributes (1067), and generates the reconstructed mesh (1095) accordingly. For example, the point cloud (1065) from the PCC decoder (1060) can provide geometry information of the vertices and the vertex attributes for the reconstruction of the reconstructed mesh (1095); the connectivity information (1075) determined by the connectivity generation module (1070) can provide connectivity information for the reconstruction of the reconstructed mesh (1095); the decoded texture maps (1066) can provide texture maps for the reconstruction of the reconstructed mesh (1095) and the decoded attributes (1067) can provide other attributes for the reconstruction of the reconstructed mesh (1095).

It is noted that components in the mesh encoder (1010), such as the preprocessing module (1011), the PCC encoder (1040), the video encoder (1041), and the attribute encoder (1042) can be respectively implemented by various techniques. In an example, a component is implemented by integrated circuitry. In another example, a component is implemented using software that can be executed by one or more processors.

It is noted that components in the mesh decoder (1050), such as the PCC decoder (1060), the connectivity generation module (1070), the mesh reconstruction module (1080), the video decoder (1061), the attribute decoder (1062) can be respectively implemented by various techniques. In an example, a component is implemented by integrated circuitry. In another example, a component is implemented using software that can be executed by one or more processors.

Figure 11:
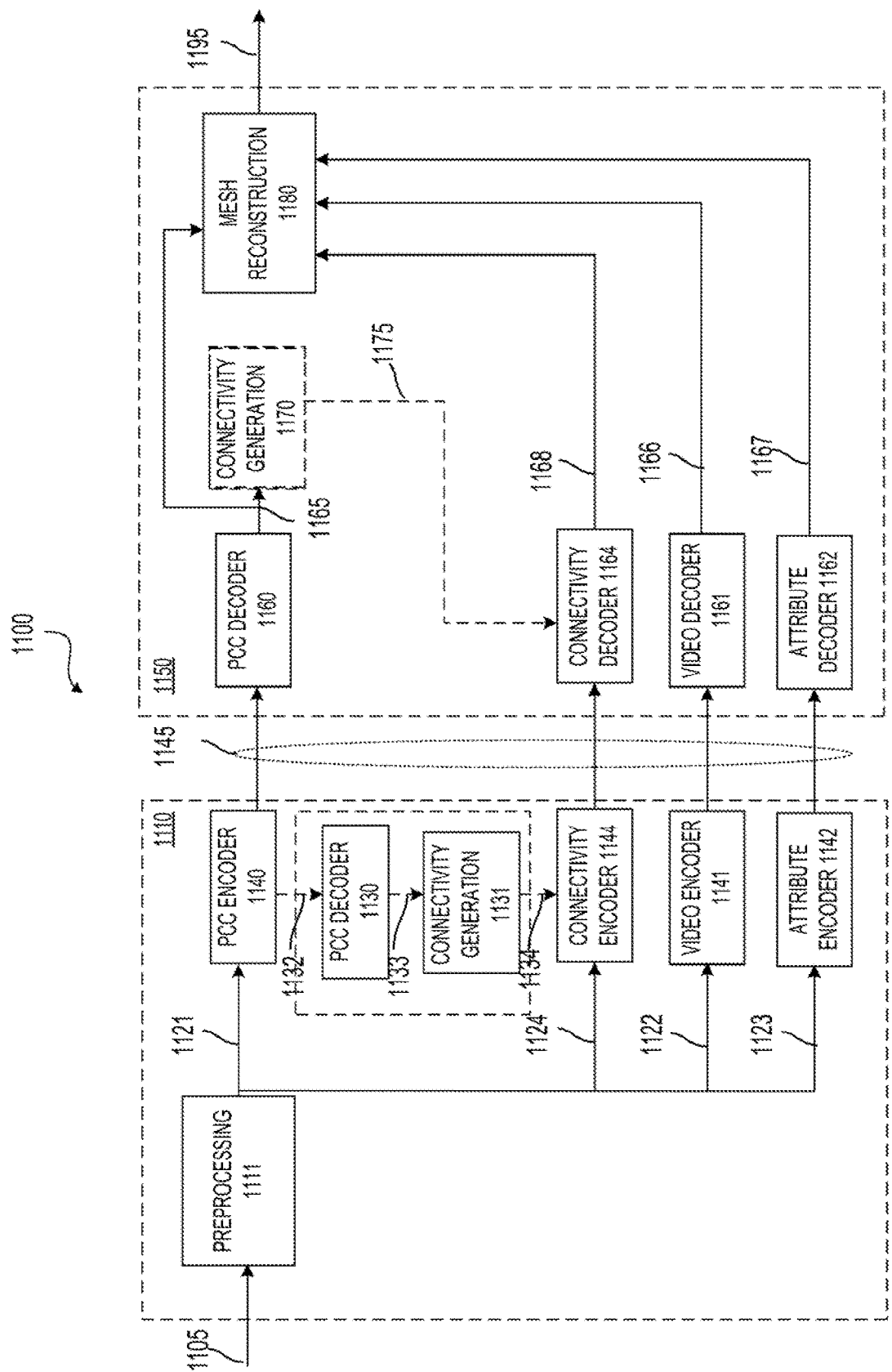
FIG. 11 shows a diagram of a framework for mesh compression according to some embodiments of the disclosure.

FIG. 11 shows a diagram of a framework (1100) for mesh compression according to some embodiments of the disclosure. The framework (1100) includes a mesh encoder (1110)

and a mesh decoder (1150). The mesh encoder (1110) encodes an input mesh (1105) (mesh frame in case of a dynamic mesh) into a bitstream (1145), and the mesh decoder (1150) decodes the bitstream (1145) to generate a reconstructed mesh (1195) (mesh frame in case of a dynamic mesh).

The mesh encoder (1110) can be any suitable device, such as a computer, a server computer, a desktop computer, a laptop computer, a tablet computer, a smart phone, a gaming device, an AR device, a VR device, and the like. The mesh decoder (1150) can be any suitable device, such as a computer, a client computer, a desktop computer, a laptop computer, a tablet computer, a smart phone, a gaming device, an AR device, a VR device, and the like. The bitstream (945) can be transmitted from the mesh encoder (1110) to the mesh decoder (1150) via a network (not shown).

In the FIG. 11 example, the mesh encoder (1110) includes a preprocessing module (1111), and a plurality of encoders, such as a PCC encoder (1140), a video encoder (1141), an attribute encoder (1142), a connectivity encoder (1144) and the like. In addition, the mesh encoder includes a PCC decoder (1130) and a connectivity generation module (1131).

The preprocessing module (1111) is configured to convert the input mesh (1105) to suitable *intermedia* data having multiple sections for encoding by the plurality of encoders. In an example, the preprocessing module (1111) can convert the input mesh (1105) to the voxelized mesh that includes a collection of equally-sized blocks on a 3D grid. The voxelized mesh can hold information about volume and connectivity.

In an example, information of the input mesh (1105) can be converted into vertices (1121), connectivity information (1124), texture maps (1122), other attributes (1123). The vertices (1121) can include geometry information of the vertices, such as (x,y,z) coordinates that describe the positions of the vertices. The vertices (1121) can also include the vertex attributes, such as normal, color reflectance, and the like. The connectivity information (1124) (also referred to as topology in some examples) includes connectivity information of the input mesh (1105). The texture maps (1122) (also referred to as attribute maps in some examples) are attributes associated with mesh surface and texture maps (1122) can be a video sequence. The other attributes (1123) can include attributes that may not be able to be coded by PCC encoder (1140) and the video encoder (1141). In some examples, the other attributes (1123) includes mapping information, such as mapping of 3D coordinates (e.g., (x, y, z)) with 2D coordinates (e.g., UV coordinates (u,v)), and the like.

According to an aspect of the disclosure, the vertices (1121) can be viewed as a point cloud and can be coded by the PCC encoder (1140). The PCC encoder (1140) can be any suitable PCC encoder, such as V-PCC encoder, G-PCC, and the like. It is noted that the vertex attributes (attributes associated with vertices), such as normal, color, reflectance, and the like, can be encoded by PCC encoder (1140).

According to an aspect of the disclosure, the connectivity encoder (1144) can directly encode the connectivity information (1124).

According to another aspect of the disclosure, the connectivity encoder (1144) is configured to encode a connectivity difference between the connectivity information (1124) (also referred to as original connectivity information) and an estimated connectivity information (1134). In the FIG. 11 example, the mesh encoder (1100) includes the PCC decoder (1130) and the connectivity generation module (1131) to generate the estimated connectivity information (1134). In an example, the PCC decoder (1130) corresponds the PCC encoder (1140). The PCC decoder (1130) can decode information that is encoded by the PCC encoder (1140). The PCC decoder (1130) can receive a copy (1132) of encoded point cloud and generate a point cloud (1133) with points that are vertices for a mesh.

The connectivity generation module (1131) can generate the estimated connectivity information (1134) from the decoded points (vertices in the context of a mesh) in the point cloud (1133). The connectivity generation module (1131) can estimate and generate the estimated connectivity information (1134) by any suitable algorithm. The connectivity encoder (1144) receives the original connectivity information (1124) and the estimated connectivity information (1134) and encodes a difference between the estimated connectivity information (1134) and the original connectivity information (1124) in the bitstream (1145).

The texture maps (1122) can be viewed as a video sequence and can be encoded by the video encoder (1141). In some examples, the texture maps (1122) can be different from the original texture maps in the input mesh (1105). The texture maps (1122) can be generated by any suitable algorithms.

The other attributes (1123) that may not be able to be coded by the PCC encoder (1140) and the video encoder (1141), can be encoded by the attribute encoder (1142). The attribute encoder (1142) can be implemented with any other attribute encoding techniques that are suitable for encoding the other attributes (1123). For example, the other attributes (1123) includes mapping information of 3D coordinates to UV coordinates, and the attribute encoder (1142) is configured to encode the mapping information.

In the FIG. 11 example, the encoded outputs from the PCC encoder (1140), the connectivity encoder (1144), the video encoder (1141) and the attribute encoder (1142) are mixed (e.g., multiplexed) into the bitstream (1145) that carries the encoded mesh corresponding to the input mesh (1105).

In the FIG. 11 example, the mesh decoder (1150) can demultiplex the bitstream (1145) into sections to be decoded respectively by a plurality of decoders, such as a PCC decoder (1160), a connectivity decoder (1164), a video decoder (1161) and an attribute decoder (1162).

In an example, the PCC decoder (1160) corresponds the PCC encoder (1140), and can decode a section of the bitstream (1145) that is encoded by the PCC encoder (1140). The PCC decoder (1160) can generate a point cloud (1165) with points that are vertices for a mesh.

In some examples, the connectivity generation module (1170) can estimate the connectivity (topology) from the decoded points (vertices in the context of a mesh) in the point cloud (1165) and output estimated connectivity information (1175). It is noted that any suitable algorithm can be used by the connectivity generation module (1170) to determine the estimated connectivity information (1175) of the vertices.

In the FIG. 11 example, the decoded point cloud (1165) is provided to the mesh reconstruction module (1180). The estimated connectivity information (1175) is provided to the connectivity decoder (1164).

The connectivity decoder (1164) corresponds to the connectivity encoder (1144), and can decode a section of the bitstream (1145) that is encoded by the connectivity encoder (1144). In an example, the connectivity encoder (1144) directly encodes connectivity information, then the connectivity decoder (1164) can decode the connectivity information and generate decoded connectivity information (1168), and provide the decoded connectivity information (1168) to the mesh reconstruction module (1180). In another example, the connectivity encoder (1144) encodes a connectivity difference, then the connectivity decoder (1164) can decode the connectivity difference and can combine the connectivity difference with the estimated connectivity information (1175) and output decoded connectivity information (1168). The decoded connectivity information (1168) can be provided to the mesh reconstruction module (1180).

According to an aspect of the disclosure, the PCC decoder (1130) and the PCC decoder (1160) can use the same decoding algorithm. Further, the connectivity generation module (1131) and the connectivity generation module (1170) can use the same connectivity estimation algorithm.

In an example, the video decoder (1161) corresponds the video encoder (1141), and can decode a section of the bitstream (1145) that is encoded by the video encoder (1141). The video decoder (1161) can generate decoded texture maps (1166). The decoded texture maps (1166) are provided to the mesh reconstruction module (1180).

In an example, the attribute decoder (1162) corresponds the attribute encoder (1142), and can decode a section of the bitstream (1145) that is encoded by the attribute encoder (1142). The attribute decoder (1162) can generate decoded attributes (1167). The decoded attributes (1167) are provided to the mesh reconstruction module (1180).

The mesh reconstruction module (1180) receives the decoded point cloud (1165), the decoded connectivity information (1168), the decoded texture maps (1166) and the decoded attributes (1167), and generates the reconstructed mesh (1195) accordingly. For example, the decoded points from the PCC decoder (1160) can provide geometry information of the vertices and the vertex attributes for the reconstruction of the reconstructed mesh (1195); the decoded connectivity information (1168) determined by the connectivity decoder (1164) can provide connectivity information for the reconstruction of the reconstructed mesh (1195); the decoded texture maps (1166) can provide texture maps for the reconstruction of the reconstructed mesh (1195) and the decoded attributes (1167) can provide other attributes for the reconstruction of the reconstructed mesh (1195).

It is noted that components in the mesh encoder (1110), such as the preprocessing module (1111), the PCC encoder (1140), the video encoder (1141), the attribute encoder (1142), the PCC decoder (1130), the connectivity generation module (1131), the connectivity encoder (1144), can be respectively implemented by various techniques. In an example, a component is implemented by integrated circuitry. In another example, a component is implemented using software that can be executed by one or more processors.

It is noted that components in the mesh decoder (1150), such as the PCC decoder (1160), the connectivity generation module (1170), the mesh reconstruction module (1180), the video decoder (1161), the attribute decoder (1162), the connectivity decoder (1164), can be respectively implemented by various techniques. In an example, a component is implemented by integrated circuitry. In another example, a component is implemented using software that can be executed by one or more processors.

In some examples, an input mesh, such as the input mesh (1005), the input mesh (1105) is provided in a form that includes 3D coordinates of vertices (geometry information), UV coordinates of the vertices (mapping information), faces (polygons, such as triangles and the like) formed of vertices (connectivity information), and texture maps. In some examples, a series of operations that can include tracking, remeshing, parameterization, voxelization, and the like can be applied on the input mesh (1005) to convert the input mesh to another form, such as a mesh with an UV atlas, such as the UV atlas (920). In some examples, the input mesh (1005) is in the form of a mesh with an UV atlas.

According to an aspect of the disclosure, vertices of the input mesh can be viewed as a point cloud and can be coded by any suitable PCC encoder. In some examples, attributes associated with the vertices, such as normal, color, reflectance, and the like can be also coded by PCC encoders.

In some embodiments, such as shown in FIG. 10, the connectivity information (topology) can be estimated on the decoded vertices by surface reconstruction algorithms, and is not explicitly encoded into a bitstream, such as the bitstream (1045).

In some embodiments, such as shown in FIG. 11, the connectivity information can be coded into the bitstream that carries the compressed mesh. In some examples, the connectivity information is directly encoded into the bitstream. In some examples, a difference between the estimated connectivity and original connectivity can be encoded into the bitstream.

According to some aspects of the disclosure, connectivity information is partially encoded into the bitstream. For example, the connectivity of certain vertices, such as dense vertices, are encoded to avoid large distortions in the reconstructed surfaces.

In some examples, the criteria to encode connectivity can be based on spatial characteristics. In an embodiment, connectivity of vertices where the curvature, such as the mean curvature or the principal curvature, is larger than a given threshold can be encoded into the bitstream. In another embodiment, the variance or the distribution of the vertex/face normals can be used to select vertices for connectivity encoding.

According to an aspect of the disclosure, texture maps can be converted as a video sequence and can be encoded by any video encoder. In some examples, the texture maps to be encoded can be different from the original texture maps (in the input mesh), any suitable algorithms can be used to generate different texture maps.

In some examples, the connectivity can be estimated from vertices in the UV atlas. In some examples, the UV atlas includes a plurality of charts (also referred to as 2D shapes, UV patches), each chart corresponds to a subset of the mesh. In some examples, to estimate connectivity based on vertices in the UV atlas, the estimated connectivity may connect vertices in different charts of the UV atlas. In an example, boundary vertices of different charts may be connected into false faces that do not exist in the original input mesh.

Some aspects of the disclosure provide techniques to convert the texture maps in response to the false faces. In some examples, a texture map is converted to add a false face that connects different charts, and the texture of the false face is determined based on vertices of the false face. In an example, a color inside a false face is determined by interpolating the colors on the vertices of the false face.

In some examples, in response to false faces that connect different charts, edges that connect different charts (referred to as false edges) can be detected, and then can be removed or replaced with edges connecting vertices in the same chart. In some examples, at the encoder side, the encoder can detect the false edges that connect vertices in different charts, and encode false edges, for example as other attributes in the bitstream. For example, the false edge information can be encoded by an attribute encoder, such as the attribute encoder (1042), the attribute encoder (1142) and the like, into the bitstream (e.g., the bitstream (1045), the bitstream (1145)) that carries the compressed mesh. Then, at the decoder side, the decoder can decode the false edge information, and remove the false edges or replace the false edges with edges that connect vertices in the same charts.

Figure 12:
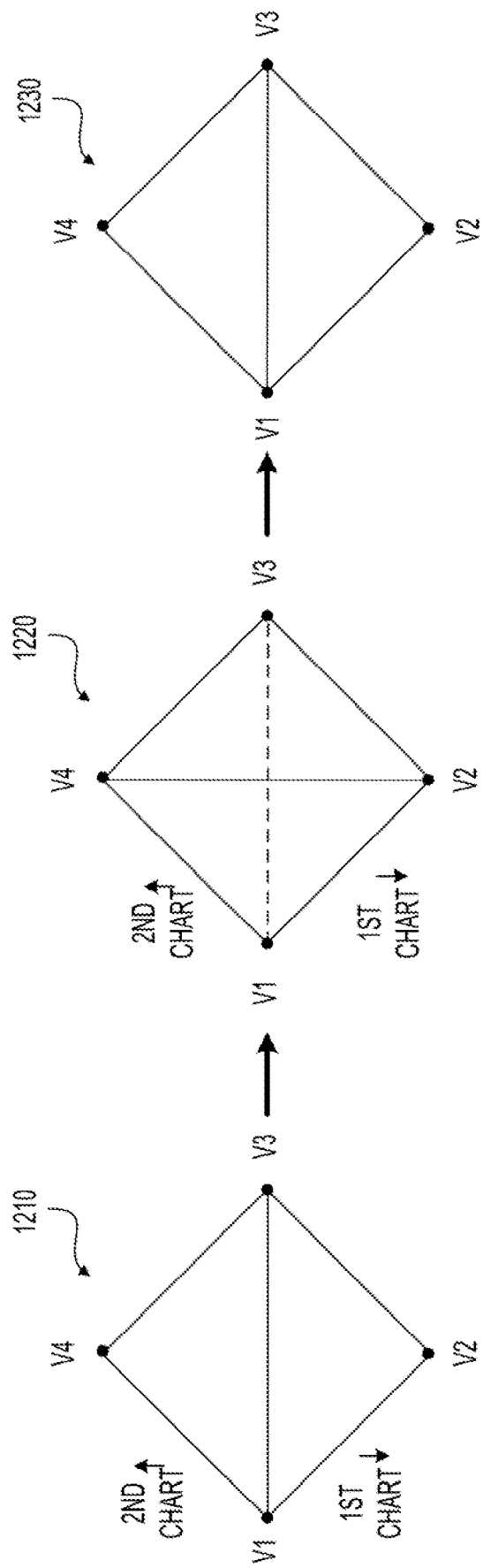
FIG. 12 shows diagrams illustrating a mesh processing technique in some examples.

FIG. 12 shows diagrams illustrating a technique to process a false edge in some examples. FIG. 12 shows a diagram (1210) of an original mesh. The original mesh includes a first chart and a second chart. The first chart includes a first triangle (v1, v2, v3), and the second chart includes a second triangle (v1, v3, v4).

In an example, a connectivity estimation algorithm is used to estimate connectivity based on vertices. FIG. 12 shows a diagram (1220) having estimated connectivity. The estimated connectivity is generated by the connectivity estimation algorithm according to vertices. The estimated connectivity is shown by a third triangle (v1, v2, v4) and a fourth triangle (v2, v3, v4). The third triangle (v1, v2, v4) and the fourth triangle (v2, v3, v4) are false triangles and includes an edge that connect vertices on 2 different charts. The false triangles can make converting texture map on 2 false faces difficult.

In an example, an edge (v2, v4) that connects vertices in 2 different charts can be detected. Because the edge (v2, v4) connects vertices in two different charts, then the edge (v2, v4) crosses the boundary of the 2 charts, thus edge (v1, v3) is a boundary edge. In an example, the false edge (v2, v4) is signaled from the encoder side. At the decoder side, the decoder can replace the false edge (x2, v4) with the boundary edge (v1, v3) to recover the original connectivity. FIG. 12 shows a diagram (1230) with the recovered connectivity. The false edge (x2, v4) is removed and the boundary edge (v1, v3) is added into the recovered connectivity.

It is noted that any other attributes that may not be able to code by PCC encoders can be coded by other the attribute encoder methods, such as by the attribute encoder (1042), the attribute encoder (1142), and the like.

As shown in FIG. 10 and FIG. 11, the decoder side can include multiple decoders, such as PCC decoder, video decoder, connectivity decoder, attribute decoder, and the like to respectively decode different sections of a bitstream (e.g., the bitstream (1045), the bitstream (1145)).

In some examples, the PCC decoder can decode a section corresponding to encoded PCC, and generates a decoded point cloud.

In some examples, the connectivity is not coded in the bitstream at all, thus, the connectivity can be estimated from the decoded points, such as by the connectivity generation module (1070) in FIG. 10.

In some examples, the connectivity is directly coded in the bitstream, and the connectivity can be derived directly from the bitstream in an example.

In some examples, the connectivity is coded by coding the difference between the original connectivity and the estimated connectivity. Thus, in an example, the connectivity is recovered by adjusting the estimated connectivity with the decoded difference.

Some aspects of the disclosure also provide techniques to recover the full connectivity when partial connectivity is coded into the bitstream. For example, the signaled partial connectivity is derived directly from bitstream on the decoder side, and the rest of the full connectivity can be estimated on the decoder side.

In an example, based on the partial connectivity derived from the bitstream, additional sample points can be generated by interpolation on the connected polygons to increase vertex density, then the connectivity of all the points (including the sampled and decoded points) can be estimated by surface reconstruction.

In some examples, the texture maps can be decoded by a video decoder and other attributes can be decoded by an attribute decoder. The decoded texture maps and the other attributes can be used to reconstruct the final mesh with textures and other attributes.

In some examples, the false edges that connect different charts are signaled. The false edges can be decoded and then can be replaced with boundary edges that can be deduced from the signaled false edges. The estimated connectivity can be changed accordingly.

Figure 13:
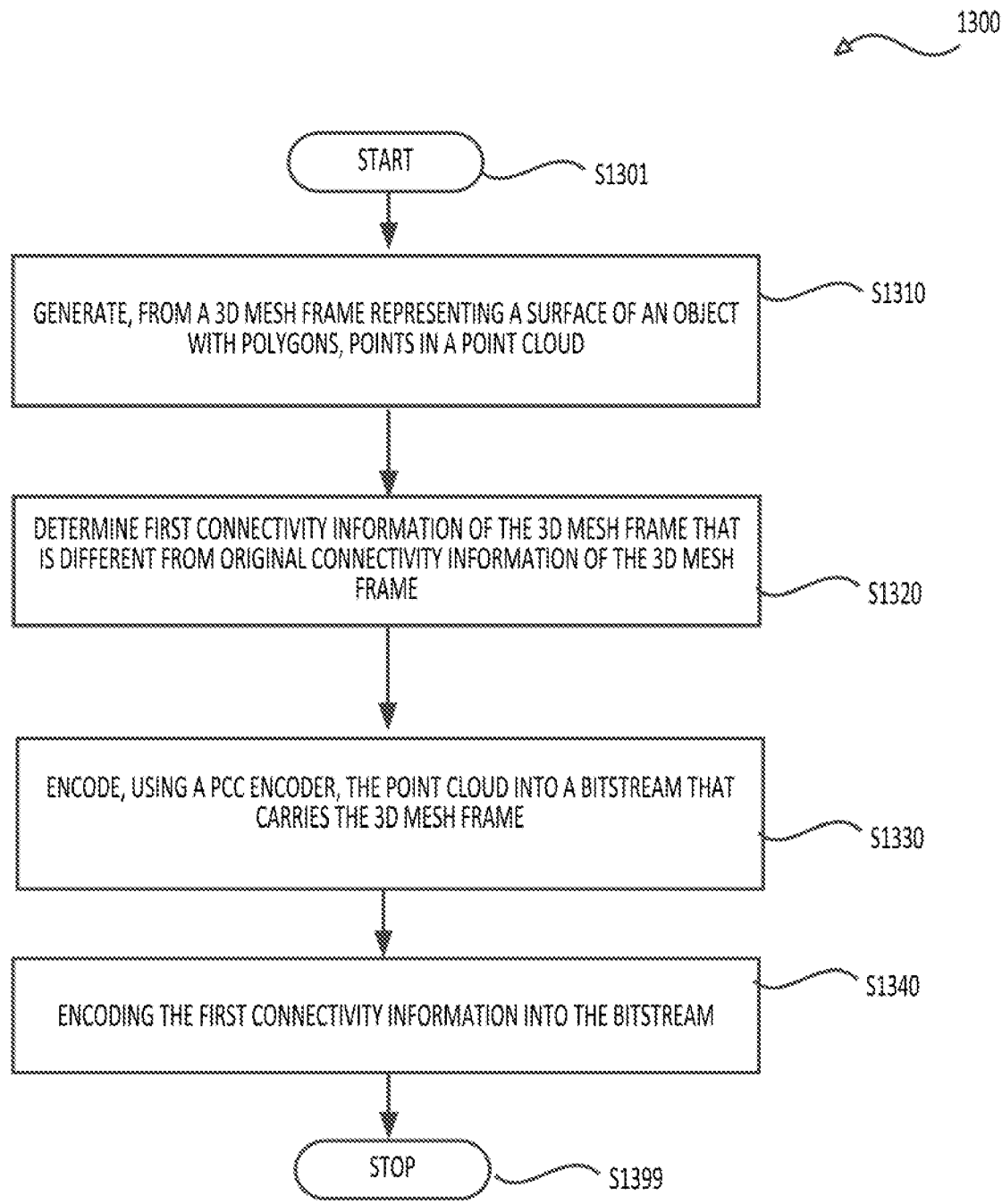
FIG. 13 shows a flow chart outlining a process example in some examples.

FIG. 13 shows a flow chart outlining a process (1300) according to an embodiment of the disclosure. The process (1300) can be used during an encoding process for a mesh. In various embodiments, the process (1300) is executed by processing circuitry. In some embodiments, the process (1300) is implemented in software instructions, thus when the processing circuitry executes the software instructions, the processing circuitry performs the process (1300). The process starts at (S1301) and proceeds to (S1310).

At (S1310), from a 3D mesh frame, points for a point cloud are generated. The 3D mesh frames represents a surface of an object with polygons. In some examples, the points corresponding to vertices of the 3D mesh frames.

At (S1320), first connectivity information of the 3D mesh frame is determined. The first connectivity information is different from original connectivity information of the 3D mesh frame.

At (S1330), the point cloud is encoded into a bitstream using a point cloud encoder.

At (S1340), the first connectivity information is encoded into the bitstream.

In some examples, the first connectivity information is partial connectivity information of the original connectivity information. In an example, the first connectivity information includes connectivity of a first plurality of vertices in a first region of the 3D mesh frame, the original connectivity information includes connectivity of a first plurality of vertices in a first region of the 3D mesh frame and also connectivity of a second plurality of vertices in a second region of the 3D mesh frame, the first region has a higher vertex density than the second region. For example, regions with vertex density higher than a threshold can be identified, and connectivity of vertices in the regions can be extracted and encoded into the bitstream.

In another example, the first connectivity information includes connectivity of a first plurality of vertices in a first region, a curvature parameter of the first region is larger than a threshold. For example, regions with a mean curvature or a principle curvature larger than a threshold can be detected, and connectivity of vertices in the regions can be extracted and encoded into the bitstream.

In another example, the first connectivity information includes connectivity of a first plurality of vertices in a first region, normal values in the first region satisfy a requirement. For example, regions with a variance or a distribution of vertex normals or face normal satisfying a requirement can be detected, and the connectivity of vertices in the regions can be extracted and encoded into the bitstream.

In another example, the points can be a portion of vertices in the 3D mesh frame. For example, some portions of the 3D mesh frame, such as a large flat surface and the like, can be represented by a reduced number of vertices without introducing distortion. The reduced number of vertices can be included into the points of the point cloud. The 3D mesh frame includes one or more additional points other than the points in the point cloud. The first connectivity information includes first connectivity of first polygons formed by the points in the point cloud.

In some examples, second connectivity information of the 3D mesh frame is inferred according to the points in the point cloud. In some examples, the second connectivity information can include one or more false edges. In an example, from the second connectivity information, a polygon with a first edge that connects a first vertex in a first chart (e.g., patch) and a second vertex in a second chart (e.g., patch) is detected. The first edge is a false edge. In some examples, a texture map can be adjusted in response to the detection of the false edge. For example, a color of a point inside the polygon is determined by an interpolation based on at least a first color of the first vertex and a second color of the second vertex. Then, the texture map is adjusted to include the point with the color inside the polygon. In an example, the adjusted texture map is encoded into the bitstream.

In some examples, second connectivity information of the 3D mesh frame is inferred according to the points in the point cloud. The first connectivity information is determined as a difference between original connectivity of the 3D mesh frame and the second connectivity information of the 3D mesh frame.

In some examples, the first connectivity information comprises false edges in the inferred connectivity information. For example, the first connectivity information includes a first edge connecting a first vertex and a second vertex to indicate that the first edge is a false edge connecting two different charts. In an example, the first connectivity information can be encoded by a connectivity encoder (e.g., the connectivity encoder (1144) and the like) into the bitstream. In another example, the first connectivity information can be encoded by other suitable attribute encoder (e.g., the attribute encoder (1042), the attribute encoder (1142), and the like).

Then, the process proceeds to (S1399) and terminates.

The process (1300) can be suitably adapted. Step(s) in the process (1300) can be modified and/or omitted. Additional step(s) can be added. Any suitable order of implementation can be used.

Figure 14:
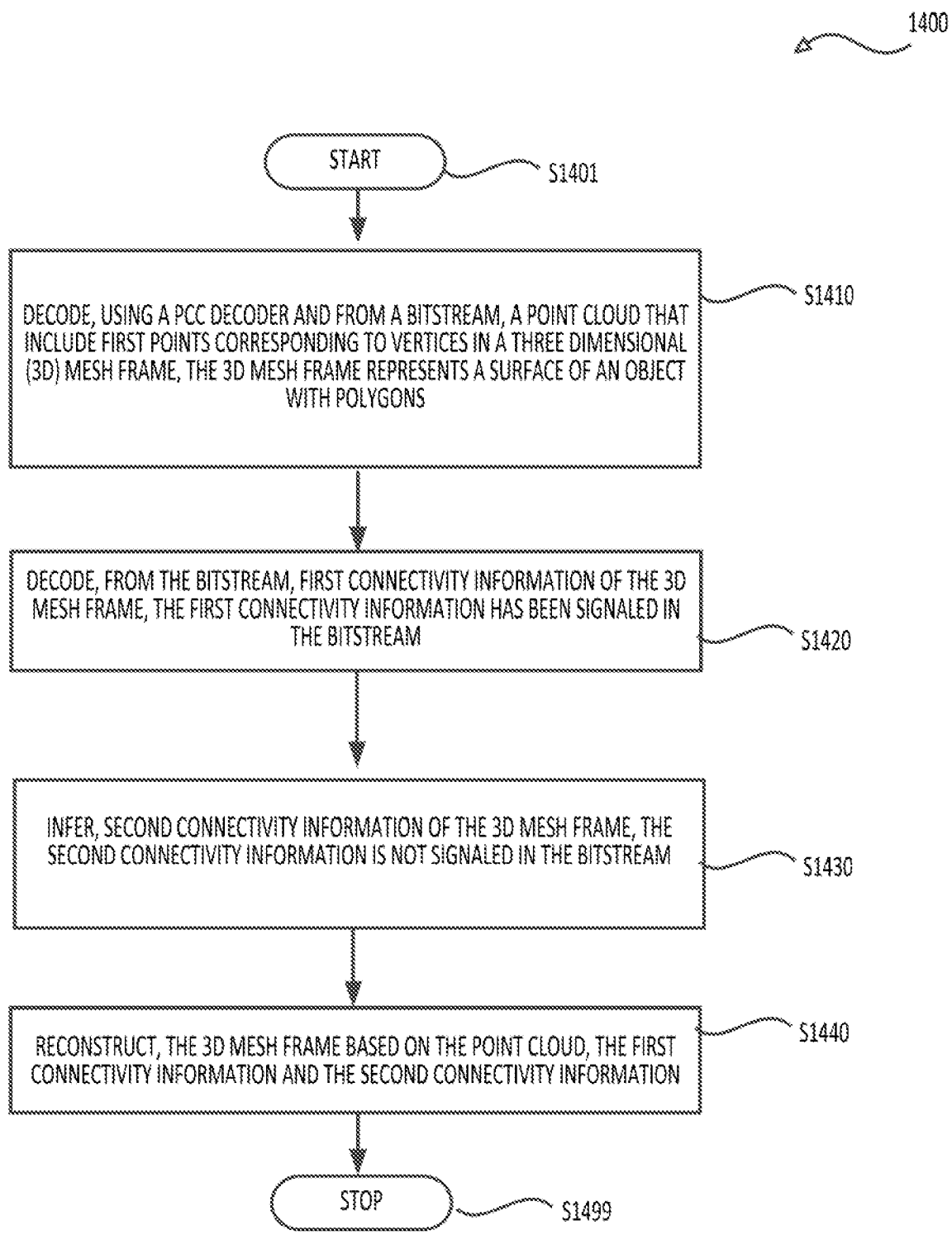
FIG. 14 shows a flow chart outlining a process example in some examples.

FIG. 14 shows a flow chart outlining a process (1400) according to an embodiment of the disclosure. The process (1400) can be used during a decoding process for a mesh sequence of mesh frames. In various embodiments, the process (1400) is executed by processing circuitry. In some embodiments, the process (1400) is implemented in software instructions, thus when the processing circuitry executes the software instructions, the processing circuitry performs the process (1400). The process starts at (S1401) and proceeds to (S1410).

At (S1410), a point cloud is decoded from a bitstream using a point cloud compression (PCC) decoder. The point cloud includes first points corresponding to vertices in a three dimensional (3D) mesh frame. The 3D mesh frame represents a surface of an object with polygons.

At (S1420), first connectivity information of the 3D mesh frame is decoded from the bitstream. The first connectivity information has been signaled in the bitstream.

At (S1430), second connectivity information of the 3D mesh frame is inferred from the points of the point cloud. The second connectivity information is not signaled in the bitstream.

At (S1440), the 3D mesh frame is reconstructed based on the point cloud, the first connectivity information and the second connectivity information.

In some examples, the first connectivity information includes connectivity of a first plurality of vertices in a first region of the 3D mesh frame, the second connectivity information includes connectivity of a second plurality of vertices in a second region of the 3D mesh frame. The first region has a higher vertex density than the second region.

In some examples, the first connectivity information includes connectivity of a first plurality of vertices in a first region, a curvature parameter of the first region is larger than a threshold.

In some examples, the first connectivity information includes connectivity of a first plurality of vertices in a first region, normal values in the first region satisfy a requirement.

In some examples, the first connectivity information includes first connectivity of first polygons of the 3D mesh frame. Then, one or more additional sample points inside the first polygons are determined by interpolation. Then, the second connectivity information of connections among all the points (the first points of the point cloud and the one or more additional sample points) is inferred.

In some examples, the second connectivity information includes a polygon with a first edge that connects a first vertex in a first chart and a second vertex in a second chart. Then, a color of a point inside the polygon is determined by an interpolation based on at least a first color of the first vertex and a second color of the second vertex.

In some examples, the first connectivity information is a connectivity difference between original connectivity of the 3D mesh frame and inferred connectivity of the 3D mesh frame. The first connectivity information is combined with the second connectivity information to generate recovered connectivity information of the 3D mesh frame. The 3D mesh frame is reconstructed based on the point cloud and the recovered connectivity information of the 3D mesh frame.

In some examples, the first connectivity information includes false edge information, for example includes a first edge connecting a first vertex and a second vertex to indicate that the first edge is a false edge connecting two different charts (patches). Then, a chart boundary edge that crosses the first edge is determined. The first edge is replaced with the chart boundary edge in the second connectivity information.

Then, the process proceeds to (S1499) and terminates.

The process (1400) can be suitably adapted. Step(s) in the process (1400) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
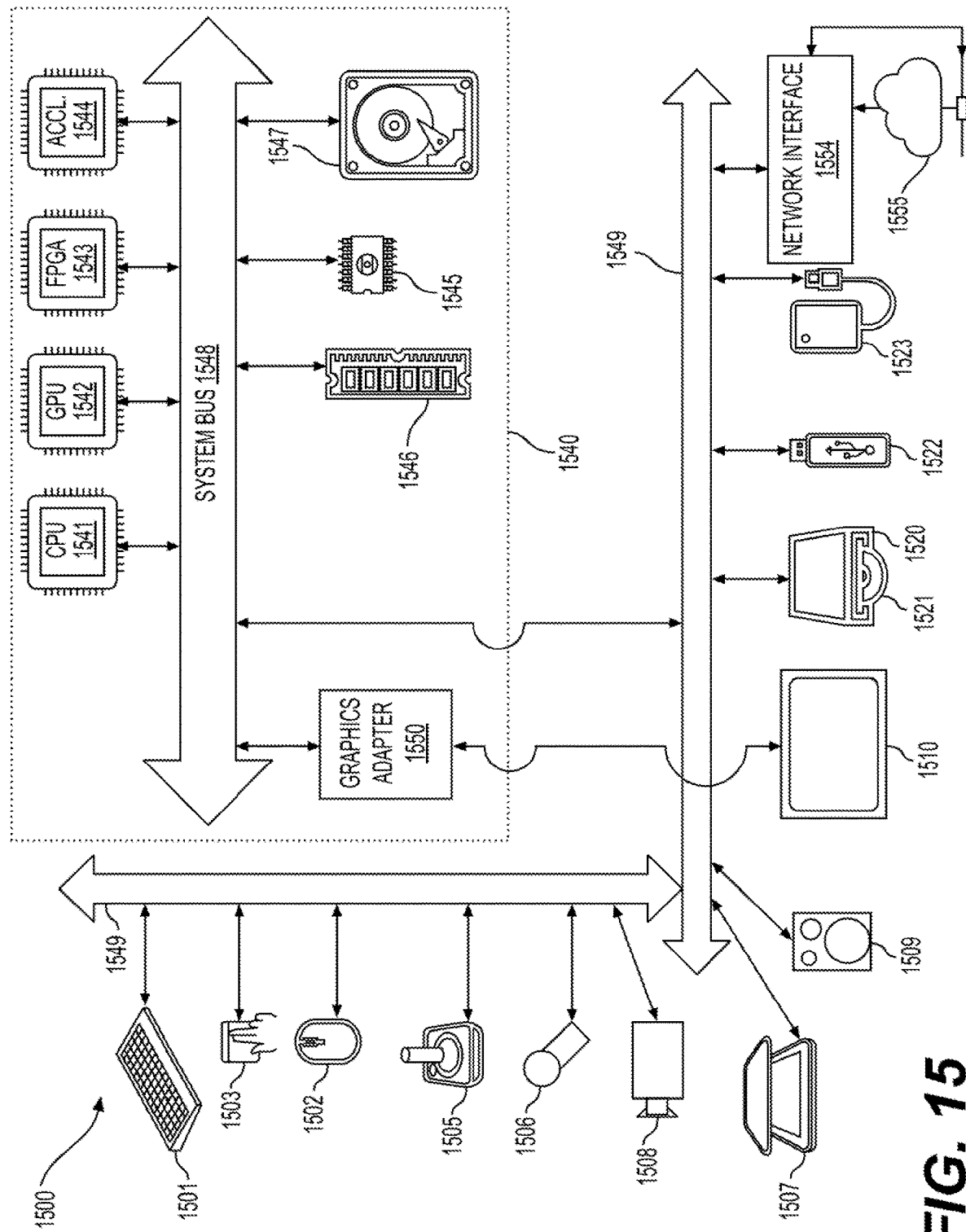
FIG. 15 is a schematic illustration of a computer system in some examples.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression, comprising:
    decoding, using a point cloud compression (PCC) decoder and from a bitstream, a point cloud that comprises first points corresponding to vertices in a three dimensional (3D) mesh frame, the 3D mesh frame representing a surface of an object with polygons;
    decoding, from the bitstream, first connectivity information of a first subset of the vertices in the 3D mesh frame that satisfy a connectivity encoding condition, the first connectivity information being signaled in the bitstream;
    inferring, second connectivity information of a second subset of the vertices in the 3D mesh frame that do not satisfy the connectivity encoding condition, the second connectivity information not being signaled in the bitstream; and
    reconstructing, the 3D mesh frame based on the point cloud, the decoded first connectivity information and the inferred second connectivity information.

2. The method of claim 1, wherein the first connectivity information comprises first connectivity of a first plurality of vertices in a first region of the 3D mesh frame, the second connectivity information comprises second connectivity of a second plurality of vertices in a second region of the 3D mesh frame, the first region that satisfies the connectivity encoding condition has a higher vertex density than the second region.

3. The method of claim 1, wherein the first connectivity information comprises connectivity of a first plurality of vertices in a first region, a curvature parameter of the first region that satisfies the connectivity encoding condition is larger than a threshold.

4. The method of claim 1, wherein the first connectivity information comprises connectivity of a first plurality of vertices in a first region, normal values in the first region satisfy the connectivity encoding condition.

5. The method of claim 1, wherein the first connectivity information comprises first connectivity of first polygons of the 3D mesh frame, the method further comprises:
    determining one or more additional sample points inside the first polygons by interpolation; and
    inferring the second connectivity information of connections of the first points and the one or more additional sample points.

6. The method of claim 1, wherein the second connectivity information comprises a polygon with a first edge that connects a first vertex in a first chart and a second vertex in a second chart, and the method further comprises:
    determining a color of a point inside the polygon by an interpolation based on at least a first color of the first vertex and a second color of the second vertex.

7. The method of claim 1, wherein the first connectivity information comprises a connectivity difference between original connectivity of the 3D mesh frame and inferred connectivity of the 3D mesh frame, the method further comprises:
    combining the first connectivity information with the second connectivity information to generate recovered connectivity information of the 3D mesh frame; and
    reconstructing the 3D mesh frame based on the point cloud and the recovered connectivity information of the 3D mesh frame.

8. The method of claim 1, wherein the first connectivity information comprises a first edge connecting a first vertex and a second vertex to indicate that the first edge is a false edge connecting two different charts, and the method comprises:
    determining a chart boundary edge that crosses the first edge; and
    replacing the first edge with the chart boundary edge in the second connectivity information.

9. An apparatus for mesh decompression, comprising processing circuitry configured to:
    decode, using a point cloud compression (PCC) decoder and from a bitstream, a point cloud that comprises first points corresponding to vertices in a three dimensional (3D) mesh frame, the 3D mesh frame representing a surface of an object with polygons;
    decode, from the bitstream, first connectivity information of a first subset of the vertices in the 3D mesh frame that satisfy a connectivity encoding condition, the first connectivity information being signaled in the bitstream;
    infer, second connectivity information of a second subset of the vertices in the 3D mesh frame that do not satisfy the connectivity encoding condition, the second connectivity information not being signaled in the bitstream; and
    reconstruct, the 3D mesh frame based on the point cloud, the decoded first connectivity information and the inferred second connectivity information.

10. The apparatus of claim 9, wherein the first connectivity information comprises first connectivity of a first plurality of vertices in a first region of the 3D mesh frame, the second connectivity information comprises second connectivity of a second plurality of vertices in a second region of the 3D mesh frame, the first region that satisfies the connectivity encoding condition has a higher vertex density than the second region.

11. The apparatus of claim 9, wherein the first connectivity information comprises connectivity of a first plurality of vertices in a first region, a curvature parameter of the first region that satisfies the connectivity encoding condition is larger than a threshold.

12. The apparatus of claim 9, wherein the first connectivity information comprises connectivity of a first plurality of vertices in a first region, normal values in the first region satisfy the connectivity encoding condition.

13. The apparatus of claim 9, wherein the first connectivity information comprises first connectivity of first polygons of the 3D mesh frame, and the processing circuitry is configured to:
- determine one or more additional sample points inside the first polygons by interpolation; and
- infer the second connectivity information of connections of the first points and the one or more additional sample points.

14. The apparatus of claim 9, wherein the second connectivity information comprises a polygon with a first edge that connects a first vertex in a first chart and a second vertex in a second chart, and the processing circuitry is configured to:
- determine a color of a point inside the polygon by an interpolation based on at least a first color of the first vertex and a second color of the second vertex.

15. The apparatus of claim 9, wherein the first connectivity information comprises a connectivity difference between original connectivity of the 3D mesh frame and inferred connectivity of the 3D mesh frame, and the processing circuitry is configured to:
- combine the first connectivity information with the second connectivity information to generate recovered connectivity information of the 3D mesh frame; and
- reconstruct the 3D mesh frame based on the point cloud and the recovered connectivity information of the 3D mesh frame.

16. The apparatus of claim 9, wherein the first connectivity information comprises a first edge connecting a first vertex and a second vertex to indicate that the first edge is a false edge connecting two different charts, and the processing circuitry is configured to:
- determine a chart boundary edge that crosses the first edge; and
- replace the first edge with the chart boundary edge in the second connectivity information.

17. A non-transitory computer-readable storage medium storing instructions which when executed by at least one processor cause the at least one processor to perform:
- decoding, using a point cloud compression (PCC) decoder and from a bitstream, a point cloud that comprises first points corresponding to vertices in a three dimensional (3D) mesh frame, the 3D mesh frame representing a surface of an object with polygons;
- decoding, from the bitstream, first connectivity information of a first subset of the vertices in the 3D mesh frame that satisfy a connectivity encoding condition, the first connectivity information being signaled in the bitstream;
- inferring, second connectivity information of a second subset of the vertices in the 3D mesh frame that do not satisfy the connectivity encoding condition, the second connectivity information not being signaled in the bitstream; and
- reconstructing, the 3D mesh frame based on the point cloud, the decoded first connectivity information and the inferred second connectivity information.

18. The non-transitory computer-readable storage medium of claim 17, wherein the second connectivity information comprises a polygon with a first edge that connects a first vertex in a first chart and a second vertex in a second chart, and the instructions cause the at least one processor to perform:
- determining a color of a point inside the polygon by an interpolation based on at least a first color of the first vertex and a second color of the second vertex.

19. The non-transitory computer-readable storage medium of claim 17, wherein the first connectivity information comprises a connectivity difference between original connectivity of the 3D mesh frame and inferred connectivity of the 3D mesh frame, and the instructions cause the at least one processor to perform:
- combining the first connectivity information with the second connectivity information to generate recovered connectivity information of the 3D mesh frame; and
- reconstructing the 3D mesh frame based on the point cloud and the recovered connectivity information of the 3D mesh frame.

20. The non-transitory computer-readable storage medium of claim 17, wherein the first connectivity information comprises a first edge connecting a first vertex and a second vertex to indicate that the first edge is a false edge connecting two different charts, and the instructions cause the at least one processor to perform:
- determining a chart boundary edge that crosses the first edge; and
- replacing the first edge with the chart boundary edge in the second connectivity information.

* * * * *